(12) United States Patent
Cheng et al.

(10) Patent No.: US 11,836,358 B2
(45) Date of Patent: Dec. 5, 2023

(54) DATA STORAGE DEVICE POWER PROVISIONS

(71) Applicant: Hewlett-Packard Development Company, L.P., Spring, TX (US)

(72) Inventors: Yu-Chen Cheng, Taipei (TW); Yu-Hung Li, Taipei (TW)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 322 days.

(21) Appl. No.: 16/977,509

(22) PCT Filed: Apr. 16, 2018

(86) PCT No.: PCT/US2018/027714
§ 371 (c)(1),
(2) Date: Sep. 2, 2020

(87) PCT Pub. No.: WO2019/203782
PCT Pub. Date: Oct. 24, 2019

(65) Prior Publication Data
US 2021/0026545 A1      Jan. 28, 2021

(51) Int. Cl.
*G06F 3/06*        (2006.01)
*G06F 1/28*        (2006.01)

(52) U.S. Cl.
CPC .............. *G06F 3/0625* (2013.01); *G06F 1/28* (2013.01); *G06F 3/0629* (2013.01); *G06F 3/0673* (2013.01)

(58) Field of Classification Search
CPC .... G06F 3/0625; G06F 3/0629; G06F 3/0673; G06F 1/28
See application file for complete search history.

(56) References Cited

U.S. PATENT DOCUMENTS 5,339,446 A * 8/1994 Yamasaki ................. G06F 1/30
                                                        713/340
5,831,351 A    11/1998 Khosrowpour et al.
7,474,886 B2    1/2009 Heller
(Continued)

FOREIGN PATENT DOCUMENTS

JP          3871953 B2 *  1/2007
WO     WO-2017052500      3/2017

*Primary Examiner* — Vincent H Tran
(74) *Attorney, Agent, or Firm* — Knobbe, Martens, Olson & Bear, LLP (57) ABSTRACT

A system comprises a power source and two power rails coupled to the power source. A storage device, comprising a non-volatile memory, a cache coupled to the non-volatile memory, and a control pin, is coupled to the second power rail. A power management controller is coupled to the first power rail and to a control pin of the storage device. The power management controller stops the provision of power via the first power rail and provides a signal to the storage device via the control pin when the provision of power via the first power rail is stopped. The storage device continues to receive power from the second power rail when the provision of power via the first power rail is stopped. The storage device stores data from the cache to the non-volatile memory in response to the receipt of the signal via the control pin.

15 Claims, 7 Drawing Sheets

(56) References Cited

U.S. PATENT DOCUMENTS

| | | | |
|---|---|---|---|
| 7,870,338 B2* | 1/2011 | Iida | G06F 11/1441 714/14 |
| 7,954,006 B1* | 5/2011 | Mangipudi | G06F 1/30 713/340 |
| 8,433,937 B1 | 4/2013 | Wheelock et al. | |
| 9,400,545 B2* | 7/2016 | Sodhi | G06F 1/3206 |
| 9,721,660 B2 | 8/2017 | Kelly et al. | |
| 9,760,147 B2 | 9/2017 | Kelly et al. | |
| 2002/0116651 A1 | 8/2002 | Beckert et al. | |
| 2003/0025396 A1* | 2/2003 | Shen | H02J 9/005 307/64 |
| 2006/0015683 A1* | 1/2006 | Ashmore | G06F 1/3268 711/135 |
| 2009/0292934 A1* | 11/2009 | Esliger | G06F 1/3203 713/323 |
| 2010/0202238 A1* | 8/2010 | Moshayedi | G06F 11/1666 714/E11.12 |
| 2011/0026328 A1* | 2/2011 | Moshayedi | G11C 16/10 365/189.05 |
| 2011/0066765 A1* | 3/2011 | Mochizuki | G06F 11/1441 710/14 |
| 2011/0239021 A1* | 9/2011 | Vedder | G06F 1/3203 713/323 |
| 2012/0159060 A1 | 6/2012 | Yu et al. | |
| 2013/0191667 A1* | 7/2013 | Haj-Yihia | G06F 1/3243 713/323 |
| 2013/0254468 A1 | 9/2013 | Miyaki | |
| 2016/0077549 A1* | 3/2016 | Wang | G06F 1/1632 710/304 |
| 2016/0086353 A1 | 3/2016 | Lukac et al. | |
| 2016/0116970 A1* | 4/2016 | Beck | G06F 1/3228 713/323 |
| 2016/0292078 A1* | 10/2016 | Hsu | G06F 12/0891 |
| 2016/0321183 A1* | 11/2016 | Govindan | G06F 1/3296 |
| 2017/0150448 A1* | 5/2017 | Stagg | H04W 52/0261 |
| 2017/0177374 A1* | 6/2017 | Morning-Smith | G06F 11/1441 |
| 2017/0337102 A1* | 11/2017 | Engler | G06F 12/0802 |
| 2018/0104912 A1 | 4/2018 | Bastian et al. | |
| 2018/0322051 A1* | 11/2018 | Heller | G06F 12/0868 |
| 2019/0129836 A1* | 5/2019 | Boyle | G06F 1/30 |
| 2019/0266098 A1* | 8/2019 | Torchalski | G06F 12/0811 |
| 2020/0065029 A1* | 2/2020 | Kim | G06F 3/0625 |

* cited by examiner

DATA STORAGE DEVICE POWER PROVISIONS

BACKGROUND

A storage device may be used for long-term storage of data for a computer system. When the computer system is shut down, the data saved to storage before the shutdown may be retrieved once the computer system is restarted.

BRIEF DESCRIPTION OF THE DRAWINGS

Various examples will be described below referring to the following figures.

DETAILED DESCRIPTION

In shutting down a computer system, data may be lost unless it is transferred to non-volatile memory. Non-volatile data storage devices may use volatile cache memory for temporary storage of data. On shutdown, the data in the cache of the storage devices may be transferred to the non-volatile memory of the storage devices. Other components of the computer system may be able to shut down while the storage devices are still being powered and transferring data to non-volatile memory. It may be useful to cease providing power to other components in the computer system while still providing power to the storage devices for transferring data to non-volatile memory.

Using multiple power rails, the computer system may cease providing power to certain components of the computer system on shutdown, while still providing power to storage devices. This may allow the storage devices to store cached data and enter a low-power mode after other components have been shut down. The inclusion of a battery as a power source may enable storage of cached data even in the event of a sudden power loss.

In one example in accordance with the present disclosure, a system is provided. The system comprises a power source; a first power rail coupled to the power source; a second power rail coupled to the power source; a storage device coupled to the second power rail, the storage device comprising a non-volatile memory, a cache coupled to the non-volatile memory, and a control pin; and a power management controller coupled to the first power rail and to the storage device via the control pin, the power management controller to: stop provision of power via the first power rail; and provide a signal to the storage device via the control pin when the provision of power via the first power rail is stopped, wherein the storage device is to continue to receive power from the second power rail when the provision of power via the first power rail is stopped, and wherein the storage device is to store data from the cache to the non-volatile memory in response to the receipt of the signal via the control pin.

In one example in accordance with the present disclosure, a system is provided. The system comprises: a battery to provide primary power to the system; a power regulator coupled to the battery, the power regulator to regulate power provided by the battery to a first power rail coupled to the power regulator; a second power rail coupled to the battery; a storage device coupled to the second power rail, the storage device comprising a non-volatile memory, a cache coupled to the non-volatile memory, and a control pin; and a power management controller coupled to the power regulator and the control pin of the storage device, the power management controller comprising an input, the power management controller to: receive a shutdown signal, via the input, indicating a system shutdown request; command the power regulator, in response to the shutdown signal, to stop the provision of power via the first power rail; and provide a store signal to the storage device via the control pin in response to the shutdown signal, wherein the storage device is to continue to receive power from the second power rail after the provision of power via the first power rail is stopped, and wherein the storage device is to store data from the cache to the non-volatile memory in response to the receipt of the store signal via the control pin.

In one example in accordance with the present disclosure, a system is provided. The system comprises: a power source; a processor coupled to the power source to receive power from the power source; a storage device coupled to the power source to receive power from the power source, the storage device comprising a non-volatile memory, a cache coupled to the non-volatile memory, and a control pin to receive a store signal; and a shutdown pin to receive a shutdown signal indicating a shutdown request, wherein the power source, in response to the shutdown signal, ceases to provide power to the processor, wherein the storage device is to continue to receive power from the power source after the power source ceases to provide power to the processor, and wherein the storage device is to receive a store signal via the control pin and is to store data from the cache to the non-volatile memory in response to the receipt of the store signal via the control pin.

A power source is a hardware device that provides power for the operation of electronic or electrical devices. A power source may be a battery, a wall outlet, a voltage converter, or any number of other devices. A power source may be a current power source or a voltage power source.

A power rail is a wire, trace, or similar material for delivering power.

A storage device is a computer-readable medium to which data can be written or retrieved. Storage device may be non-volatile storage, such as a hard drive, solid state drive, Flash memory, or electrically erasable programmable read only memory (EEPROM). Storage device may be a volatile storage device, such as a random access memory (RAM) or cache. Storage device may be a read-only medium or a write-only medium.

Non-volatile memory is computer-readable media that retains stored data after external power is removed from the memory.

Cache is a volatile computer-readable media that stores a copy of data being written to or read from another computer-readable media.

Control pin is an input used to control behavior of a device. A control pin may be a physical pin, a wire, a trace, or similar material for delivering an electrical signal.

Shutdown pin is a control pin for receiving a shutdown signal.

Power management controller is a device that interfaces with a power source to control power functions of a system, such as monitoring power connections, controlling delivery of power, recharging of batteries, and shutting down or initializing power delivery. A power management controller may be implemented as part of the power source or as an external device. A power management controller may include a processor, controller, FPGA, or discrete logic.

Low-power mode is a state of a device that draws less power on average than is drawn on average during full operation of the device.

Power regulator is a device that provides a stable power supply. A power regulator may regulate a minimum or maximum provided voltage or a minimum or maximum provided current.

Figure 1:
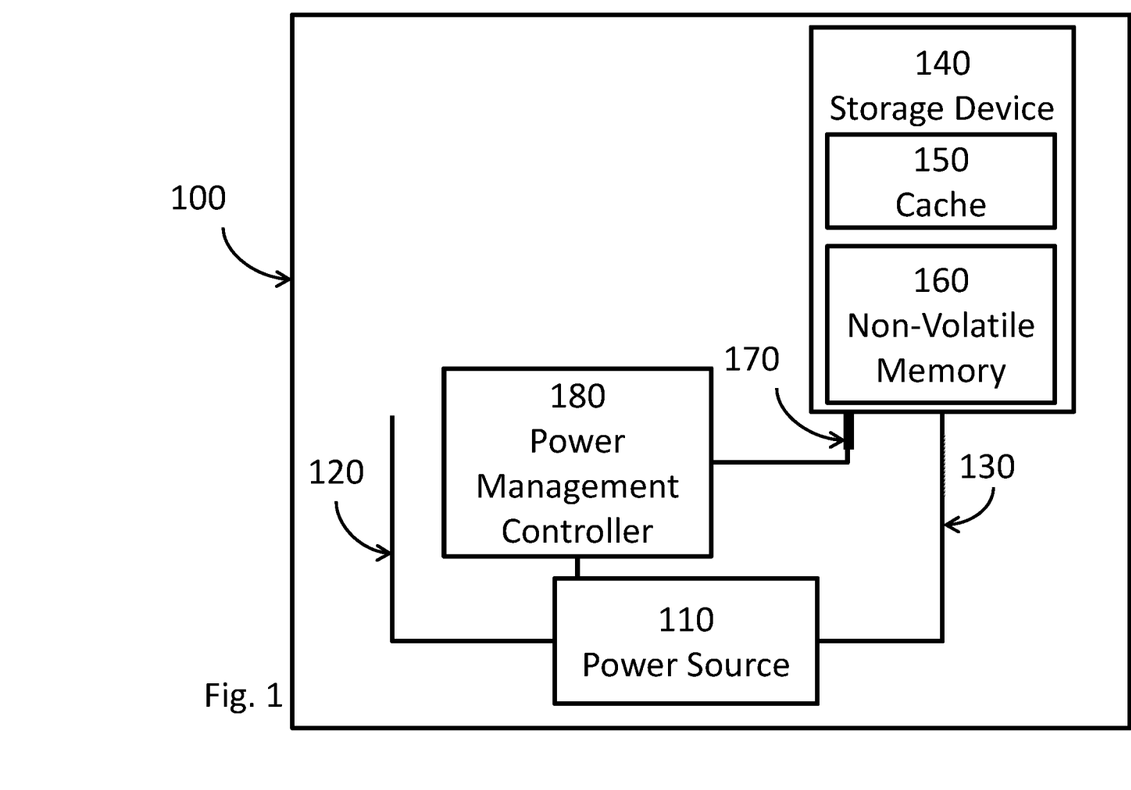
FIG. 1 shows a computer system with a power management controller and a storage device in accordance with various examples.

FIG. 1 shows a computer system 100 with a power management controller 180 and a storage device 140 in accordance with various examples. The computer system 100 includes a power source 110. Power source 110 is coupled to a first power rail 120 and a second power rail 130. Second power rail 130 is coupled to storage device 140. Storage device 140 includes a cache 150 and non-volatile memory 160. Storage device 140 also includes a control pin 170. Power management controller 180 is coupled to storage device 140 via control pin 170. Power management controller 180 is coupled to power source 110.

Computer system 100 may be an electronic device that provides storage capacity. Computer system 100 may be a laptop or desktop computer system, a mobile phone, a tablet, a digital video recorder, a datalogging device, or any number of other varieties of computer systems. While not depicted in FIG. 1, computer system 100 may include a processor and other system components.

Power source 110 may provide the power used by computer system 100. Power source 110 may include a battery. The battery may be rechargeable and charged by an external power source or by another component of power source 110. Power source 110 may be a power supply unit that accepts external power, such as from a wall outlet or a powered bus, and distributes the power to components of the computer system 100. One example of a powered bus is the Universal Serial Bus (USB). Power source 110 may perform a power conversion, such as converting power from alternating current (AC) power to direct current (DC) power. Power source 110 may convert the voltage or current provided by an external power source or internal battery. Power conversion may be performed in various ways, such as by using a transformer, a linear regulator, an AC/DC converter, a DC/DC converter.

Power source 110 may provide power to power rails 120, 130 for distribution of power to components of the computer system 100. The power supplied via the power rails 120, 130 may have the same specifications, or they may be different. In various examples, both power rails 120, 130 may provide the same voltage, but the first power rail 120 may be able to provide a higher current. In various examples, the voltage provided by the first power rail 120 may be higher or lower than the voltage provided by the second power rail 130. Power source 110 may be able to switch the provision of power on the power rails 120, 130 on or off independently of each other. The provision of power on the second power rail 130 may be always on, as long as there is power to be provided by the power source 110.

Storage device 140 may be a long-term storage device, such as a hard drive, a solid state drive (SSD), an embedded MultiMediaCard (eMMC), a universal Flash storage (UFS) device, a secure digital (SD) card device, a compact disk (CD) device, or a tape drive. Storage device 140 may include non-volatile memory 160, such as Flash memory, an optical disk, electromagnetic tape, an electromagnetic disk, or electrically erasable programmable read-only memory (EEPROM). Storage device 140 may include a cache 150. Storage device may be removable media, such as a USB drive, or partially removable, such as a CD device where the non-volatile memory 160 is removable but the cache 150 is not removable.

Cache 150 may include volatile memory, such as dynamic random access memory (DRAM) or static random access memory (SRAM). In transferring data to or from storage device 140, the data may pass through the cache 150. During a write operation, data written to storage device 140 may be written to cache 150, and the storage device 140 may signal completion of the write operation without writing the data to non-volatile memory 160. If the cache 150 is volatile memory and the computer system 100 or storage device 140 is shut down, the data stored in the cache 150 may be lost unless it is written to non-volatile memory 160 during the shutdown operation.

Control pin 170 may be used to signal storage device 140 of a shutdown operation. The shutdown operation may be a general computer system 100 shutdown, such as when an operating system is placing a computer in a sleep or shutdown state, or a user has pressed a power button for a length of time to initiate a system shutdown. The shutdown operation may be specific to the storage device 140, such as when the storage device 140 has not been recently accessed. Control pin 170 may be a dedicated pin for indicating a shutdown operation, or it may be part of a bus. Different signals may be multiplexed over control pin 170, with only a specific signal indicating a shutdown operation. For example, control pin 170 may be used for general control of storage device 140, such as in receiving a read or write command and the address and data for the read or write operation.

Power management controller 180 may send a shutdown signal to storage device 140 via control pin 170. Power management controller 180 may also send a shutdown signal to other components of computer system 100. Power management controller 180 may be coupled to first power rail 120 via power source 110. Power management controller 180 may signal power source 110 to cease providing power via first power rail 120. In various examples, power management controller 180 may be coupled to a switch that controls the flow of power from power source 110 onto first power rail 120. In various examples, power management controller 180 maybe coupled to first power rail 120, but not via power source 110, such as power management controller 180 controlling a switch external to power source 110 that allows or prevents the flow of power from power source 110 via first power rail 120.

Storage device 140 may draw power from second power rail 130. In a shutdown event, power management controller 180 may signal the shutdown event to storage device 140 via control pin 170. In various examples, power management controller may signal the shutdown event to other components of the computer system 100. In various examples, components other than storage device 140 may not receive a shutdown signal. In response to the shutdown event, power source 110 may cease providing power via first power rail 120. If components other than storage device 140 receive a shutdown signal, the provisioning of power on the first power rail 120 may continue for a time to allow components to shut down. The provisioning of power on the first power rail 120 may continue for a set period of time or be discontinued after a signal is received. For example, a processor may receive a shutdown signal and send a signal indicating it has completed shutdown operations, with the provisioning of power on the first power rail 120 ceasing in response to the signal indicating the processor has completed shutdown operations. Power source 110 may continue providing power via second power rail 130 after discontinuing the provisioning of power via first power rail 120. Storage device 140 may transfer data from cache 150 to non-volatile memory 160 in response to a shutdown signal received via control pin 170. The transferring of data may continue after the provisioning of power via first power rail 120 has ceased, as storage device 140 may continue to draw power from second power rail 130. After storage device 140 transfers data from cache 150 to non-volatile memory 160, storage device 140 may enter a low-power mode. In various examples, storage device 140 may enter low-power mode in response to completing the transfer of data from cache 150 to non-volatile memory 160. In various examples, storage device 140 may enter low-power mode a predetermined amount of time after receiving a shutdown signal via control pin 170. The predetermined amount of time may be calculated based on the worst-case scenario for the maximum amount of time to transfer data from cache 150 to non-volatile memory 160. The predetermined amount of time may depend on a storage size of the cache 150 and the transfer speed between the cache 150 and non-volatile memory 160. The predetermined amount of time may also account for the possibility of storage device 140 being in the middle of an operation when the shutdown signal is received and waiting for the operation to complete or be cancelled before beginning a transfer of data from cache 150 to non-volatile memory 160.

According to various examples, power source 110 may continue to provision power via second power rail 130 after shutdown operations are complete. According to various examples, power source 110 may cease providing power via second power rail 130 after storage device 140 a predetermined amount of time after storage device 140 receives a shutdown signal.

Figure 2:
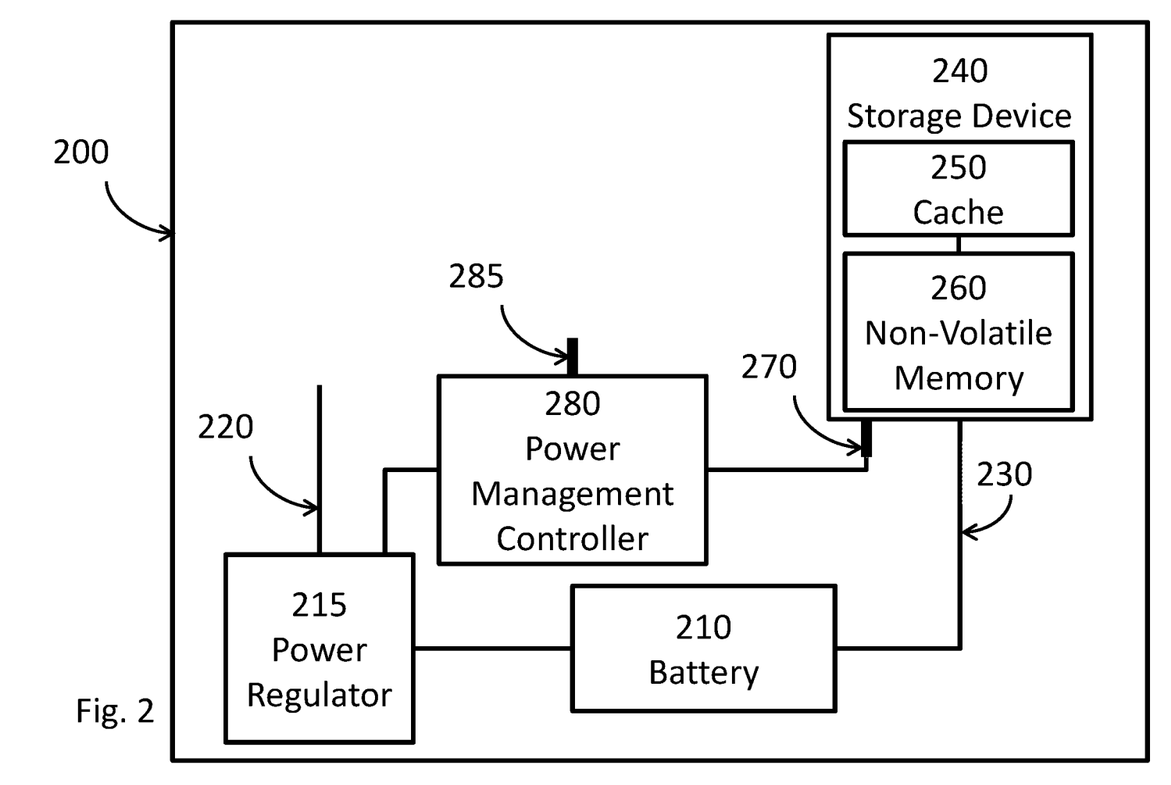
FIG. 2 shows a computer system with a power management controller, power regulator, and storage device in accordance with various examples.

FIG. 2 shows a computer system 200 with a power management controller 280, power regulator 215, and storage device 240 in accordance with various examples. Computer system 200 includes a battery 210. Battery 210 is coupled to power regulator 215, which is coupled to first power rail 220. Battery 210 is also coupled to second power rail 230. Second power rail 230 is coupled to storage device 240. Storage device 240 includes a cache 250 and non-volatile memory 260. Storage device 240 also includes a control pin 270. Power management controller 280 is coupled to storage device 240 via control pin 270. Power management controller 280 is coupled to power regulator 215. Power management controller includes shutdown pin 285.

Battery 210 may include a rechargeable battery. Battery 210 may be recharged from an external power source, such as via a wall outlet or a powered bus. Battery 210 may have an energy capacity to power the computer system 200 for some time in the absence of an external power source. In various examples, the battery may have an energy capacity to power the system for at least thirty minutes at full operation in the absence of an external power source.

Power regulator 215 may include a DC/DC converter, such as a buck/boost converter. Power regulator 215 may control the provision of power via first power rail 220. Power management controller 280 may signal power regulator 215 to cease providing power via first power rail 220.

Power management controller 280 may receive a shutdown signal via shutdown pin 285 indicating a shutdown request. The shutdown request may be caused by various conditions. In various examples, the shutdown request may be caused by a loss of power or by a low-power condition of battery 210. In various examples, the shutdown request may be caused by the operating system (OS), such as when the OS is to be shut down or restarted. In response to the shutdown signal, power management controller 280 may sent a shutdown signal to various components of computer system 200, such as to storage device 240 via control pin 270. Other components, such as a processor or network controller, may also receive a shutdown signal from power management controller 280. In response to the shutdown signal, power management controller 280 may command power regulator 215 to cease providing power via first power rail 220. Such command to power regulator 215 may allow enough time for various computer system 200 components to shut down in response to a shutdown signal. In various examples, power management controller 280 may wait for a signal that a component of computer system 200 has completed its shutdown operation before power management controller 280 commands power regulator 215 to cease providing power via first power rail 220. Battery 210 may continue providing power via second power rail 230 after power regulator 215 ceases providing power via first power rail 220, during which time storage device 240 transfers data from cache 250 to non-volatile memory 260. The transfer of data may be in response to receiving a shutdown signal via control pin 270. Storage device 240 may enter a low-power mode after completing the transfer of data from cache 250 to non-volatile memory 260.

Figure 3:
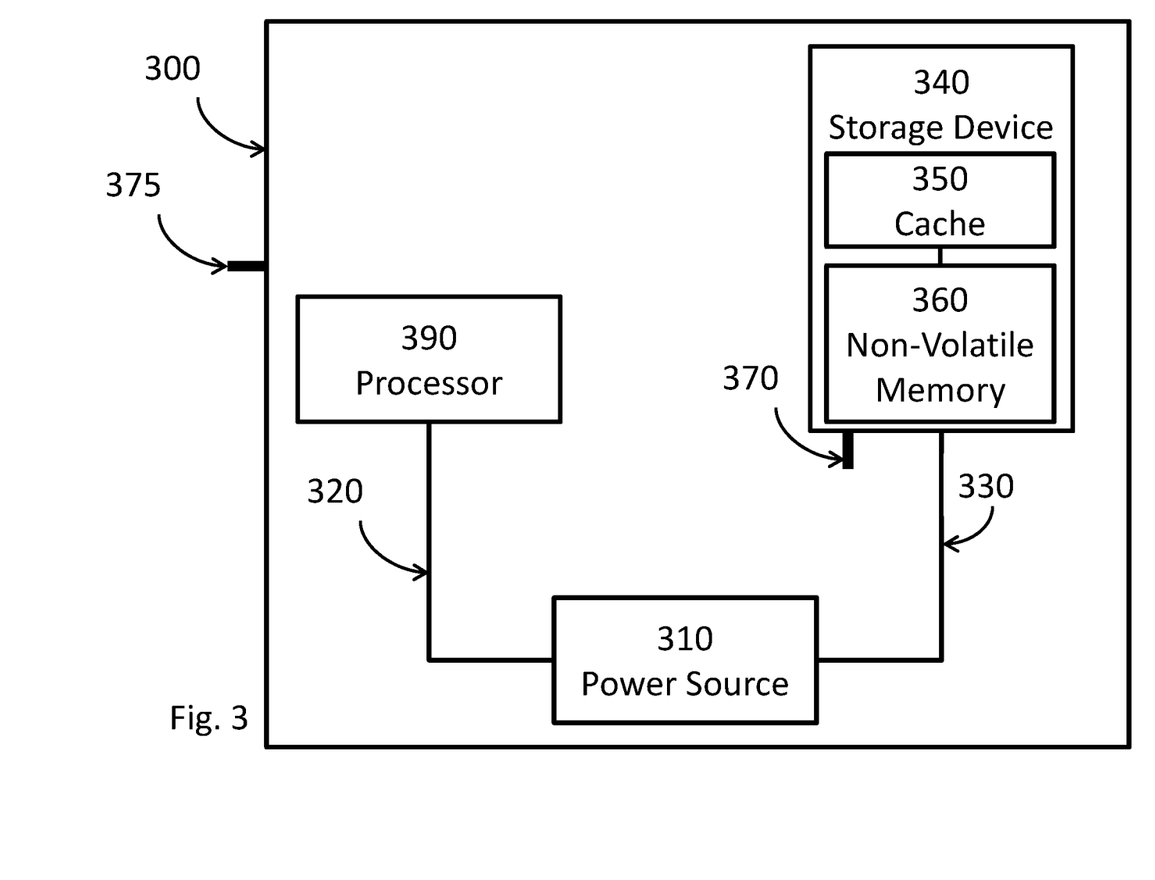
FIG. 3 shows a computer system with a processor, power source, and storage device in accordance with various examples.

FIG. 3 shows a computer system 300 with a processor 390, power source 310, and storage device 340 in accordance with various examples. Computer system 300 includes a power source 310. Power source 310 is coupled to first power rail 320. First power rail 320 is coupled to processor 390. Power source 310 is also coupled to second power rail 330. Second power rail 330 is coupled to storage device 340. Storage device 340 includes a cache 350 and non-volatile memory 360. Storage device 340 also includes a control pin 370. Computer system 300 also includes a shutdown pin 375.

Processor 390 may include a central processing unit (CPU) for computer system 300. Processor may read or write date to storage device 340, such as via a bus.

Computer system 300 may receive a shutdown request via shutdown pin 375. In various examples, the shutdown request may be caused by a power switch. In various examples the shutdown request may be caused by pressing and holding a power button for a certain amount of time, such as 5 seconds. In response to the shutdown request, computer system 300 may send shutdown signals to components of the computer system 300. Storage device 340 may receive a shutdown request via control pin 370. Processor 390 may receive a shutdown request, such as via an interrupt. Power source 310 may receive a shutdown request. Power source 310 may cease providing power via first power rail 320 in response to the shutdown request received on shutdown pin 375, such as after a predetermined amount of time or in response to a command from processor 390 to cease providing power on first power rail 320. Power source 310 may continue providing power on second power rail 330 after ceasing to provide power on first power rail 320. Storage device 340 may transfer data from cache 350 to non-volatile memory 360 in response to a signal received via control pin 370. The transfer of data from cache 350 to non-volatile memory 360 may take place after power is no longer being provided on first power rail 320. After the transfer of data from cache 350 to non-volatile memory 360 is complete, storage device 340 may enter a low-power mode.

Figure 4:
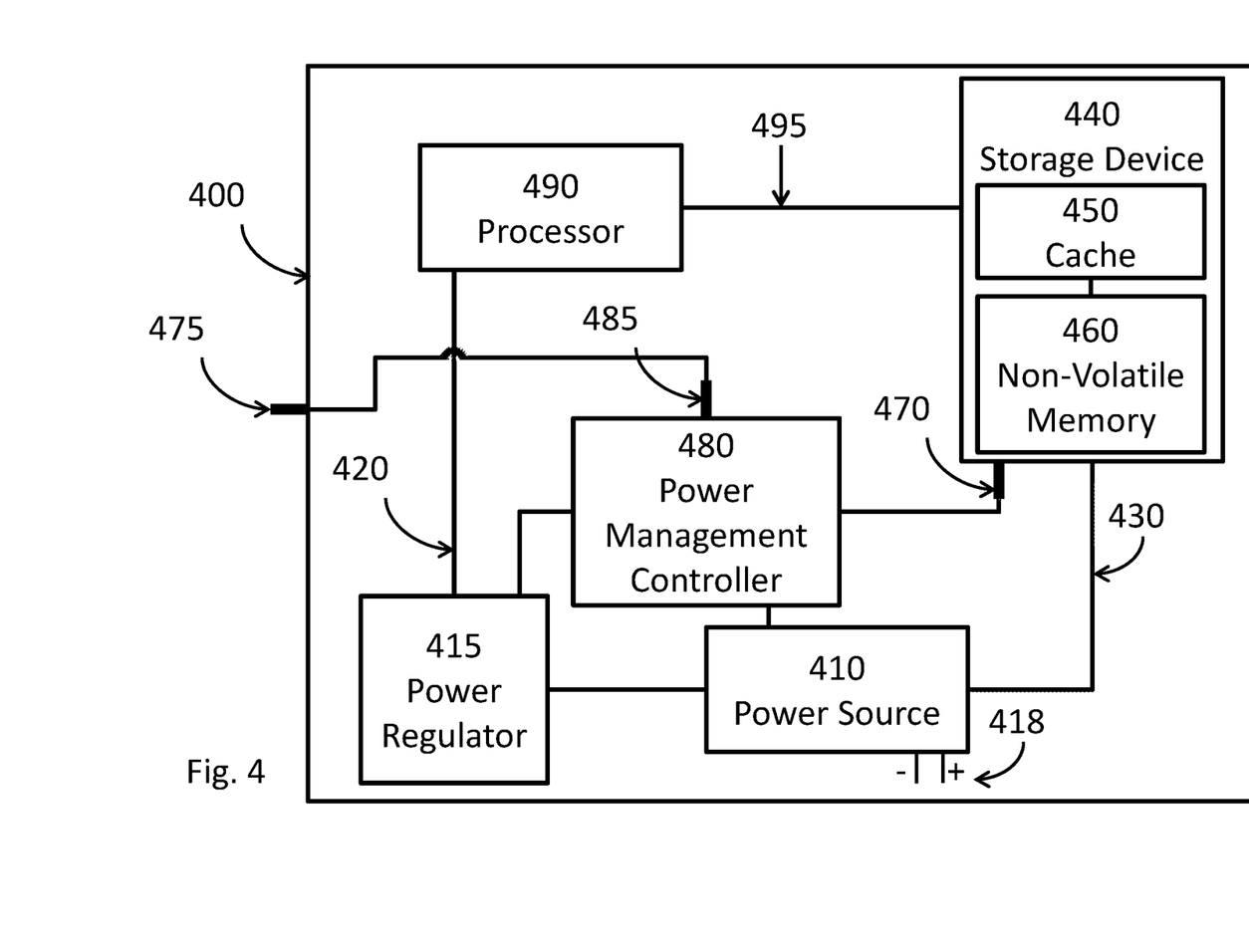
FIG. 4 shows a computer system with a power management controller, power regulator, and storage device in accordance with various examples.

FIG. 4 shows a computer system 400 with a power management controller 480, power regulator 415, and storage device 440 in accordance with various examples. Computer system 400 includes a power source 410. Power source includes a power input 418. Power source 410 is coupled to power regulator 415. Power regulator 415 is coupled to first power rail 420. First power rail 420 is coupled to processor 490. Power source 410 is also coupled to second power rail 430. Second power rail 430 is coupled to storage device 440. Storage device 440 includes a cache 450 and non-volatile memory 460. Storage device 440 also includes a control pin 470. Processor 490 is coupled to storage device 440 via a bus 495. Computer system 400 also includes a shutdown pin 475. Shutdown pin 475 is coupled to power management controller 480 via a shutdown pin 485. Power management controller 480 is coupled to power regulator 415 and power source 410. Power management controller 480 is also coupled to storage device 440 via control pin 470.

Power input 418 may be a connection to a wall outlet, an external battery, or some other external power source. Power source 410 may include a rechargeable battery, which may be recharged by power provided to computer system 400 via power input 418.

Processor 490 may exchange data with storage device 440 via bus 495. The connection between bus 495 and storage device 440 may include control pin 470.

Computer system may receive a shutdown request via shutdown pin 475. In response to a shutdown signal received on shutdown pin 475, various components of computer system 400 may receive a shutdown signal. Shutdown pin 475 may provide the signal to shutdown pin 485 of power management controller 480. In various examples, another component may receive the signal from shutdown pin 475 and provide a shutdown signal to power management controller 480 via shutdown pin 485. Processor 490 may receive a shutdown signal in response to a shutdown signal received on shutdown pin 475. After computer system 400 has received a shutdown signal via shutdown pin 475, power regulator may cease providing power on first power rail 420. After power is no longer being provided via first power rail 420, storage device 440 may still be receiving power via second power rail 430 and transferring data from cache 450 to non-volatile memory 460. The transferring of data from cache 450 to non-volatile memory 460 may be in response to receiving a signal via control pin 470, indicating a shutdown request. In various examples, storage device 440 may enter low-power mode a predetermined amount of time after receiving a shutdown request via control pin 470. The amount of time may depend on the size of cache 450 and the rate at which data can be transferred between cache 450 and non-volatile memory 460. In various examples, storage device 440 may monitor the transfer of data from cache 450 to non-volatile memory 460 and enter low-power mode once the transfer is complete. In various examples, power source 410 may continue to provide power via second power rail 430 after storage device 440 has entered low-power mode. In various examples, power source 410 may cease providing power via second power rail 430, such as after a predetermined amount of time or on receiving a signal indicating the storage device 440 has completed shutdown operations. Storage device 440 may signal power management controller 480 once storage device 440 has completed shutdown operations. In response to receiving a signal that storage device 440 has completed shutdown operations, power management controller 480 may signal power source 410 to cease providing power via second power rail 430.

Figure 5:
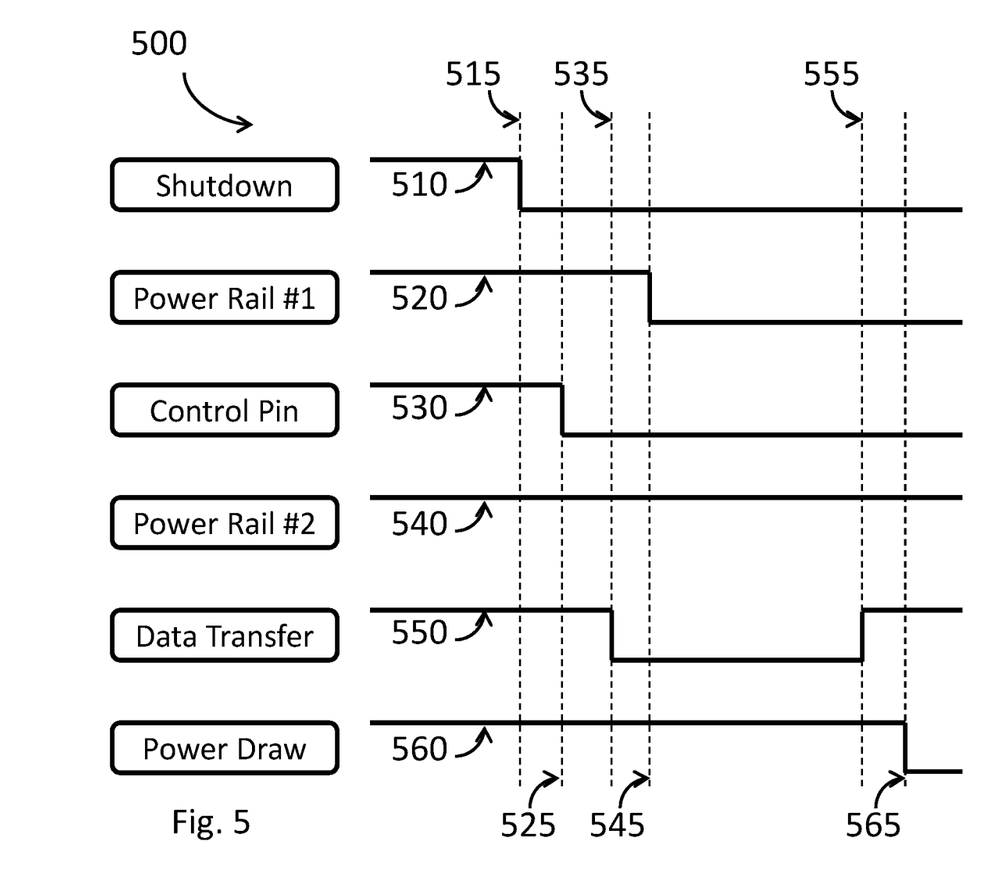
FIG. 5 shows a timing diagram of a computer power system at shutdown in accordance with various examples.

FIG. 5 shows a timing diagram 500 of a computer power system at shutdown in accordance with various examples. A shutdown signal 510 indicates that a system shutdown event is occurring by changing state at a system shutdown notification time 515. The shutdown signal 510 may change state in response to an external event, such as a power button being pressed and held for 5 seconds, or the shutdown signal 510 may change state in response to an internal event, such as the OS signaling via a processor that the OS is shutting down.

In response to the shutdown signal 510 state change at the shutdown notification time 515, the power supplied by a first power rail 520 may cease at a system power down time 545. Prior to the system power down time 545, the power supplied by a first power rail 520 may provide power for system components such as a processor, a network interface connector, and random access memory (RAM).

In response to the shutdown signal 510 state change at the shutdown notification time 515, the control pin signal 530 may change state at a forced data store time 525. The control pin signal 530 may be received by storage devices to signal that data stored in cache should be transferred to non-volatile memory. While the forced data store time 525 is depicted here as occurring prior to the system power down time 545, the forced data store time 525 could take place after the system power down time 545. In various examples, a processor may write data to the storage device as the processor shuts down. Such data may be written to the cache and then written to non-volatile memory.

The storage device may perform an internal data transfer between cache and non-volatile memory. Such an internal data transfer is indicated by a low value of the data transfer line 550. Here, an internal data transfer between the cache is indicated as occurring between a data transfer start time 535 and a data transfer stop time 555. In response to the control pin signal 530 at a forced data store time 525, storage device may begin an internal data transfer between the cache and non-volatile memory at a data transfer start time 535. Once the data from the cache has been stored in non-volatile memory, the storage device may stop the internal transfer at a data transfer stop time 555.

In response to the control pin signal 530 at a forced data store time 525, the storage device may enter a low-power mode at a low-power mode time 565. In various examples, the storage device may enter low-power mode further in response to the completion of the data transfer at a data transfer stop time 555. In various examples, the storage device may enter low-power mode a predetermined amount of time after the control pin signal 530 indicates a shutdown event at the forced data store time 525. The predetermined amount of time may be calculated based on the worst-case scenario for the maximum amount of time to transfer data from cache to non-volatile memory. The predetermined amount of time may depend on a storage size of the cache and the transfer speed between the cache and non-volatile memory. The predetermined amount of time may also account for the possibility of storage device being in the middle of an operation when the control pin signal is received and waiting for the operation to complete or be cancelled before beginning a transfer of data from cache to non-volatile memory.

The power supplied by a second power rail 540 may continue to be supplied after system power down time 545 and after the low-power mode time 565.

In various examples, the signals depicted in FIG. 5 may be actual signals. In various examples, the signals depicted in FIG. 5 may indicate the conceptual timing of events and not represent actual signals. In various examples, the signals depicted in FIG. 5 may be edge-based signals or level-based signals. In various examples, the signals depicted in FIG. 5 may be inverted.

Figure 6:
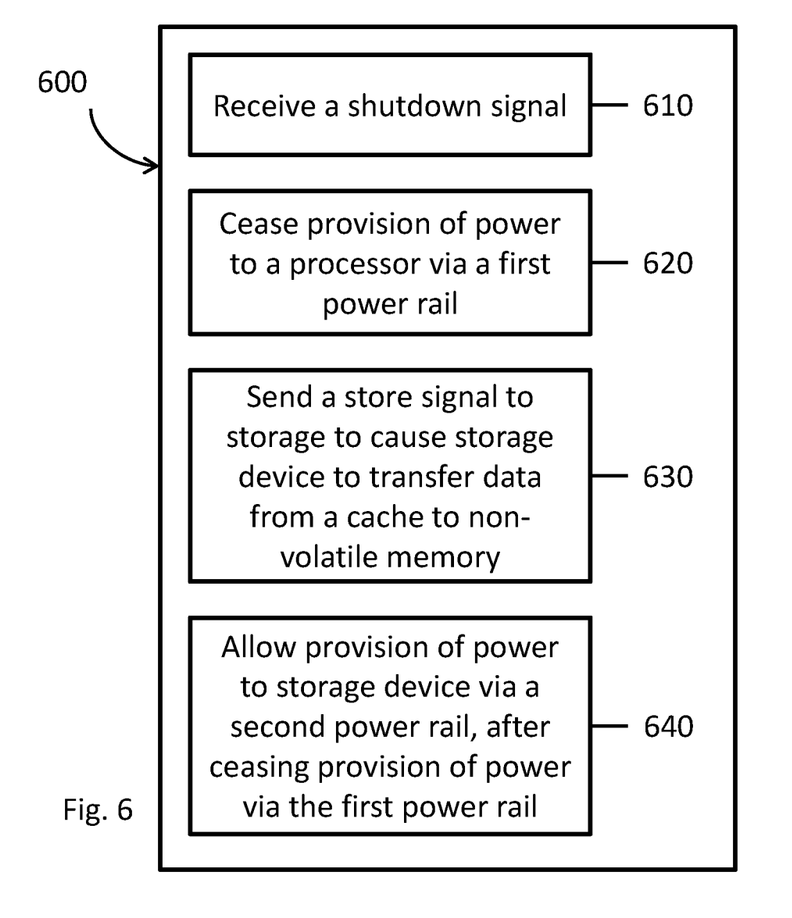
FIG. 6 shows a computer-readable medium with machine-readable instructions for execution by a processor in connection with a shutdown event.

FIG. 6 shows a computer-readable medium 600 with machine-readable instructions 610, 620, 630, 640 for execution by a processor in connection with a shutdown event. The processor executing the machine-readable instructions 610, 620, 630, 640 may be a power management controller, such as is described in FIGS. 1, 2, and 4, or a processor, such as described in FIGS. 3 and 4. Machine-readable instruction 610, when executed by a processor, causes the processor to receive a shutdown signal. Machine-readable instruction 620, when executed by a processor, causes the processor to cease provision of power to a processor via a first power rail. Machine-readable instruction 630, when executed by a processor, causes the processor to send a store signal to a storage device to cause storage device to transfer data from a cache to non-volatile memory. Machine-readable instruction 640, when executed by a processor, causes the processor to allow provision of power to storage device via a second power rail, after ceasing provision of power via the first power rail.

Figure 7:
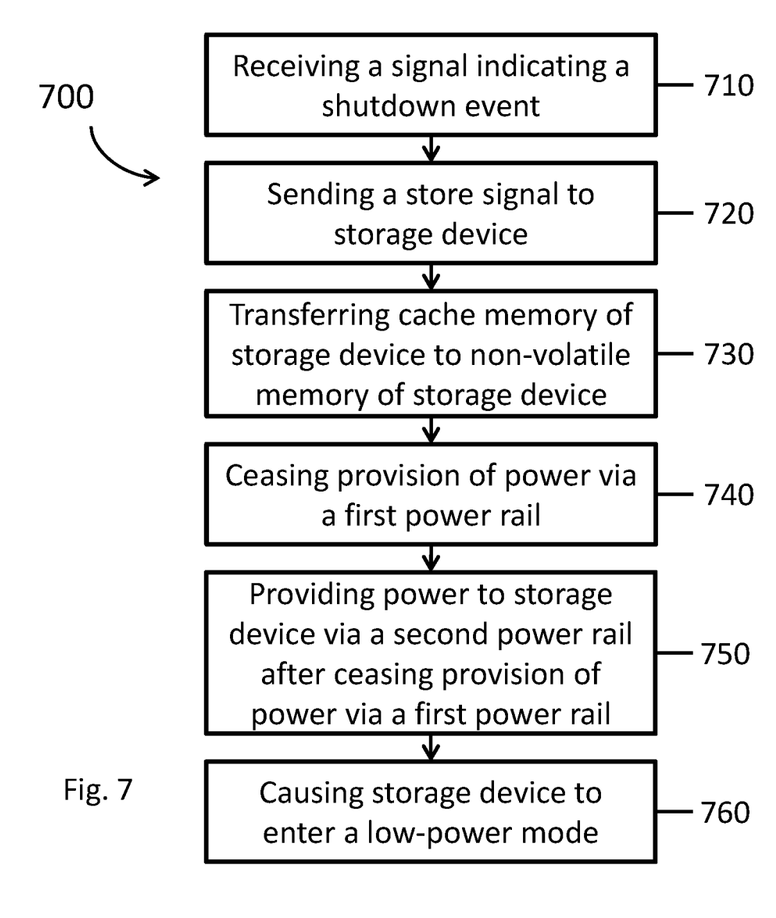
FIG. 7 shows a flow diagram for a method used in shutting down a computer system.

FIG. 7 shows a flow diagram for a method 700 used in shutting down a computer system. Method 700 may be performed in part by a power management controller, such as is described in FIGS. 1, 2, and 4, or a processor, such as described in FIGS. 3 and 4. Method 700 includes receiving a signal indicating a shutdown event 710. Method 700 includes sending a store signal to storage device 720. Method 700 includes transferring cache memory of storage device to non-volatile memory of storage device 730. Method 700 includes ceasing provision of power via a first power rail 740. Method 700 includes providing power to storage device via a second power rail after ceasing provision of power via a first power rail 750. Method 700 includes causing storage device to enter a low-power mode 760.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
a power source;
a first power rail coupled to the power source;
a second power rail coupled to the power source;
a storage device coupled to the second power rail, the storage device comprising a non-volatile memory, a cache, and a control pin; and
a power management controller coupled to the first power rail and to the storage device via the control pin, in response to a user's shutdown request the power management controller to:
stop provision of power via the first power rail; and
provide a signal to the storage device via the control pin when the provision of power via the first power rail is stopped,
wherein the storage device is to continue to receive power from the second power rail when the provision of power via the first power rail is stopped, wherein the storage device is to store data from the cache to the non-volatile memory in response to a receipt of the signal via the control pin, and wherein the storage device is to enter a low-power mode a predetermined amount of time after provision of power via the first power rail is stopped, the predetermined amount of time corresponding to that which is needed to transfer the data from the cache to the non-volatile memory and that which is needed for a previous storage operation to be completed before beginning the transfer of the data from the cache to the non-volatile memory.

2. The system of claim 1, wherein the storage device is to receive power from the second power rail after the storage of data from the cache to the non-volatile memory in response to the receipt of the signal via the control pin and after the provision of power via the first power rail is stopped.

3. The system of claim 1, wherein the power source comprises a battery.

4. The system of claim 3, wherein the battery has an energy capacity to power the system for at least thirty minutes.

5. The system of claim 1, wherein the predetermined amount of time further corresponds to that which is needed to wait for a storage operation to be canceled before beginning the transfer of data from the cache to the non-volatile memory.

6. A system comprising:
a first power rail;
a battery;
a power regulator coupled to the battery, the power regulator to regulate power provided by the battery to the first power rail;
a second power rail coupled to the battery;
a storage device coupled to the second power rail, the storage device comprising a non-volatile memory, a cache, and a control pin; and
a power management controller coupled to the power regulator and the control pin of the storage device, the power management controller comprising an input, the power management controller to:
receive a shutdown signal, via the input, indicating a user initiated system shutdown request; and
in response to the shutdown request:
command the power regulator to stop the provision of power via the first power rail; and
provide a store signal to the storage device via the control pin,
wherein the storage device is to continue to receive power from the second power rail after the provision of power via the first power rail is stopped, wherein the storage device is to store data from the cache to the non-volatile memory in response to a receipt of the store signal via the control pin, and wherein the storage device is to enter a low-power mode a predetermined amount of time after provision of power via the first power rail is stopped, the predetermined amount of time corresponding to that which is needed to transfer the data from the cache to the non-volatile memory and that which is needed for a previous storage operation to be completed before beginning the transfer of the data from the cache to the non-volatile memory.

7. The system of claim 6, further comprising a processor coupled to the first power rail and to receive power from the battery via the first power rail.

8. The system of claim 7, wherein the processor is coupled to the storage device, wherein the processor is to transfer data to the storage device, and wherein the data is to be stored in the cache of the storage device.

9. The system of claim 6, wherein the battery is a rechargeable battery and comprises a power input to receive power.

10. The system of claim 6, wherein the predetermined amount of time further corresponds to that which is needed to wait for a storage operation to be canceled before beginning the transfer of data from the cache to the non-volatile memory.

11. A system comprising:
a power source;
a processor coupled to the power source to receive power from the power source;
a storage device coupled to the power source to receive power from the power source, the storage device comprising a non-volatile memory, a cache, and a control pin to receive a store signal; and
a shutdown pin to receive a shutdown signal indicating a user initiated shutdown request,
wherein the power source, in response to the shutdown signal, is to cease to provide power to the processor, wherein the storage device is to continue to receive power from the power source after the power source ceases to provide power to the processor, and wherein the storage device is to:
receive a store signal via the control pin;
store data from the cache to the non-volatile memory in response to a receipt of the store signal via the control pin; and
enter a low-power mode a predetermined amount of time after provision of power to the processor is stopped, the predetermined amount of time corresponding to that which is needed to transfer the data from the cache to the non-volatile memory and that which is needed for a previous storage operation to be completed before beginning the transfer of the data from the cache to the non-volatile memory.

12. The system of claim 11, further comprising a power management controller coupled to the power source and the shutdown pin, wherein the power management controller is to send the store signal to the storage device via the control pin in response to receipt of a shutdown signal via the shutdown pin.

13. The system of claim 11, wherein the power source comprises a rechargeable battery.

14. The system of claim 11, wherein the predetermined amount of time is based on a storage size of the cache and a data transfer speed between the cache and the non-volatile memory.

15. The system of claim 11, wherein the predetermined amount of time further corresponds to that which is needed to wait for a storage operation to be canceled before beginning the transfer of data from the cache to the non-volatile memory.

* * * * *